United States Patent
Shin

[19]

[11] Patent Number: 5,996,975
[45] Date of Patent: Dec. 7, 1999

[54] CONDENSER FOR CARRIER RECOVERY APPARATUS OF LIQUID IMAGING SYSTEM

[75] Inventor: Seong-soo Shin, Yongin, Rep. of Korea

[73] Assignee: Samsung Electronics Co., Ltd., Kyungki-do, Rep. of Korea

[21] Appl. No.: 09/089,391

[22] Filed: Jun. 3, 1998

[30] Foreign Application Priority Data

Aug. 27, 1997 [KR] Rep. of Korea ................. 97-23390

[51] Int. Cl.⁶ ................................................. B01D 47/16
[52] U.S. Cl. .............................. 261/87; 261/93; 96/332; 96/352
[58] Field of Search .................. 261/84, 91, 87, 261/93, 122.1; 55/404; 96/286, 289, 332, 352, 353, FOR 137

[56] References Cited

U.S. PATENT DOCUMENTS

| | | | |
|---|---|---|---|
| 3,108,146 | 10/1963 | Gross | 96/353 |
| 3,490,996 | 1/1970 | Kelly, Jr. | 261/93 |
| 3,962,042 | 6/1976 | Malick | 261/93 |
| 4,051,204 | 9/1977 | Muller et al. | 261/93 |
| 4,066,722 | 1/1978 | Pietruszewski et al. | 261/93 |
| 4,287,137 | 9/1981 | Sonoyama et al. | 261/93 |
| 4,290,885 | 9/1981 | Kwak | 261/93 |
| 4,699,740 | 10/1987 | Bollenrath | 261/93 |
| 5,030,362 | 7/1991 | Da Silva et al. | 261/122.1 |
| 5,454,986 | 10/1995 | Lessen | 261/93 |
| 5,512,217 | 4/1996 | Batterham et al. | 261/93 |
| 5,582,777 | 12/1996 | Vento | 261/93 |
| 5,858,072 | 1/1999 | Motoda | 96/332 |

*Primary Examiner*—C. Scott Bushey
*Attorney, Agent, or Firm*—Sughrue, Mion, Zinn Macpeak & Seas, PLLC

[57] ABSTRACT

A condenser for a carrier recovery apparatus of a liquid imaging system is provided. The condenser for a carrier gas recovery apparatus of a liquid imaging system for recovering a carrier gas as a liquid carrier by collecting and condensing the carrier gas evaporated by a drying unit of the imaging system, includes a bubble generating member provided at a vapor discharging end of a gas duct for inducing the collected carrier gas into the liquid carrier contained in the condenser. The bubble generating member generates bubbles from the carrier gas in the liquid carrier and a rotation member installed in front of the bubble generating member rotates to make the bubbles generated by the bubble generating member into finer bubbles. A rotation driving device rotates the rotation member. Therefore, since the carrier vapor is turned into fine bubbles, the contact area of the bubbles with the liquid carrier increases and condensation is sufficiently performed, thereby improving the recovery efficiency of the carrier vapor.

5 Claims, 5 Drawing Sheets

CONDENSER FOR CARRIER RECOVERY APPARATUS OF LIQUID IMAGING SYSTEM

BACKGROUND OF THE INVENTION

1. Field of the Invention

The present invention relates to a condenser for a vapor recovery apparatus of an imaging system. More particularly, this invention is directed to a condenser for a vapor recovery apparatus of an imaging system having a vapor generator for generating fine bubbles in a carrier vapor so that the carrier vapor is more effectively condensed.

2. Description of the Related Art

In general, an imaging system, applied to a printer or a copier, uses a photosensitive medium such as a photoreceptor drum or a photoreceptor belt, on which a latent electrostatic image is formed.

The imaging system is largely divided into a wet type and a dry type according to the type of toner used. Tile liquid imaging system employs a developer liquid having a toner mixed with a volatile liquid carrier. The liquid imaging system using such a developer liquid has a better printing quality than the dry imaging system using a powdered toner, and also protects against ill effects of the harmful toner powder, and thus, is being used increasingly.

Referring to FIG. 1, the typical liquid imaging system includes a photoreceptor belt 110 on an endless track, a first transfer roller 121, a second transfer roller 122 and a third transfer roller 123, for circulating the photoreceptor belt 110 in a given path.

Also, a main charger 135 is installed at one side of the photoreceptor belt 110 for charging the surface of photoreceptor belt 110 into uniform charges. In the lower portion of the photoreceptor belt 110, there are provided a laser scanning unit (LSU) 130 for scanning a laser beam onto the photoreceptor belt 110 according to an image signal and to form a latent electrostatic image, and a development device 140 for developing the latent electrostatic image into a toner image by applying a developer liquid composed of a toner having a predetermined color to a region where the latent electrostatic image is formed. Particularly, in the case of a color printer, there are provided a plurality of laser scanning units (LSUs) 130 for color image implementation and a plurality of development devices each containing a developer liquid having a predetermined color.

As described above, since the liquid carrier is contained in the developer liquid which sticks to the latent electrostatic image region of the photoreceptor belt 110, the carrier is removed in a drying unit 150 after the developing of the latent electrostatic image. The drying unit 150 includes a drying roller 151 and a heating roller 152 installed parallel to and spaced a predetermined distance apart from the third roller 123. The drying roller 151 absorbs the liquid carrier from the surface of the photoreceptor belt 110 and dries the developer liquid so that only the toner image remains. The liquid carrier absorbed into the drying roller 151 is heated by the heating roller 152 and evaporated to then be removed.

FIGS. 2 and 3 illustrate a carrier gas recovery apparatus provided in the vicinity of the drying unit 150 in the conventional liquid imaging system having the aforementioned configuration. FIG. 2 is a block diagram of a carrier gas recovery mechanism of the carrier recovery apparatus and FIG. 3 is a schematic diagram of the carrier recovery apparatus.

Since the carrier evaporated by the drying unit 150 is harmful to humans, it is necessary to prevent the evaporated carrier from being effused to the air. Also, in order to decrease operating costs, it is necessary to reduce the overall consumption of the liquid carrier by recycling the liquid carrier. Thus, there is generally provided a carrier gas recovery apparatus for recovering the carrier gas as a liquid carrier by collecting and condensing the carrier evaporated by the drying unit 150.

Referring to FIG. 2, the carrier gas recovery mechanism of the conventional liquid imaging system will now be described. The carrier gas evaporated by the drying unit 150 is collected by a collector 160. Part of the carrier gas is liquefied in the collector 160 and the remaining carrier gas is sent to a condenser 170 to be condensed and then liquefied. The liquid carrier is sent to a recovery reservoir 180 for recycling. The air from which the carrier gas is removed while passing through the condenser 170 is exhausted outside via a filter 190.

As shown in FIG. 3, the drying unit 150 includes the drying roller 151 and the heating roller 152. The drying roller 151 is installed parallel to and spaced a predetermined distance apart from the third roller 123 and absorbs the liquid carrier sticking to the photoreceptor belt 110. The heating roller 152 evaporates the absorbed liquid carrier.

The collector 160 installed to surround the drying unit 150 collects the carrier gas. Part of the collected carrier gas is again liquefied and sent to the recovery reservoir 180 installed under the collector 160. Most of the remaining carrier gas is sent to the condenser 170. The cold liquid carrier is contained in the condenser 170.

A gas duct 171 for inducing the carrier gas from the collector 160 and an air exhaust tube 174 for exhausting the air from which the carrier gas is removed are provided in the upper portion of the condenser 170, and a liquid carrier exhaust tube 173 for exhausting the liquid carrier is connected to one side of the condenser 170. The liquid carrier exhaust tube 173 is installed a predetermined height from the bottom of the condenser 170 for maintaining a constant height from the surface level of the liquid carrier contained in the condenser 170.

When the carrier gas is induced into the condenser 170 via the gas duct 171, the air is also induced inside the condenser 170. Here, the carrier gas is contacted with the cold liquid carrier to then be liquefied, and the air is exhausted outside via the air exhaust tube 174 while passing through the liquid carrier. A tan 191 is provided for discharging the air to the outside. The condensed liquid carrier is exhausted to the recovery reservoir 180 via the liquid carrier exhaust tube 173 positioned at a predetermined height at one side of the condenser 170.

A first pump 172 for pumping the carrier gas present within the collector 160 is installed at a predetermined position of the gas duct 171. Also, a second pump 182 for supplying the liquid carrier recovered in the recovery reservoir 180 to the development device is installed at a predetermined position of a liquid carrier supply tube 181.

In the condenser 170 for a carrier gas recovery apparatus of the aforementioned conventional imaging system, the collected carrier gas is simply injected into the cold liquid carrier contained in the condenser 170. The carrier gas injected into the liquid carrier is turned into bubbles, and the bubbles move upward to the surface level of the liquid carrier so as to contact the cold liquid carrier to then be condensed and liquefied.

However, since the bubbles are relatively large, the contact area with the liquid carrier is not sufficient. Also, due to the large size the bubbles move fast so that the contact time is not sufficient either. Thus, the carrier gas is not sufficiently liquefied. Since the carrier gas is not sufficiently liquefied, the recovery efficiency of the carrier gas is decreased. Accordingly, part of the carrier gas is not liquefied but is exhausted to the outside in a vapor state, which is harmful to humans.

SUMMARY OF THE INVENTION

To solve the above problems, it is an objective of the present invention to provide a condenser for a carrier gas recovery apparatus of an imaging system, which can efficiently recover carrier vapor.

Accordingly, to achieve the above objective, there is provided a condenser for a carrier gas recovery apparatus of a liquid imaging system for recovering a carrier gas as a liquid carrier by collecting and condensing the carrier gas evaporated by a drying unit of the imaging system. The condenser comprises: a bubble generating member provided at a vapor discharging end of a gas duct for inducing the collected carrier gas into the liquid carrier contained in the condenser, for generating bubbles from the carrier gas; a rotation member installed in front of the bubble generating member and rotating to make the bubbles generated by the bubble generating member into finer bubbles; and a rotation driving means for rotating the rotation member.

The bubble generating member may be made of a porous material and the rotation member may have a meshed structured shape.

Also, the rotation driving means comprises: a shaft installed within the gas duct and having its one end connected to the rotational center of the rotation member; a shaft supporting member installed within the gas duct for rotatably supporting the shaft; and a rotation blade installed at the other end of the shaft and rotating by the flow of the carrier gas present within the gas duct, for rotating the rotation member.

Therefore, according to the present invention, since the carrier gas injected into a condenser is turned into finer bubbles by a bubble generator, the contact area of the bubbles of the carrier gas with the liquid carrier increases. Thus, condensation is sufficiently performed, thereby improving the recovery efficiency of the carrier gas.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
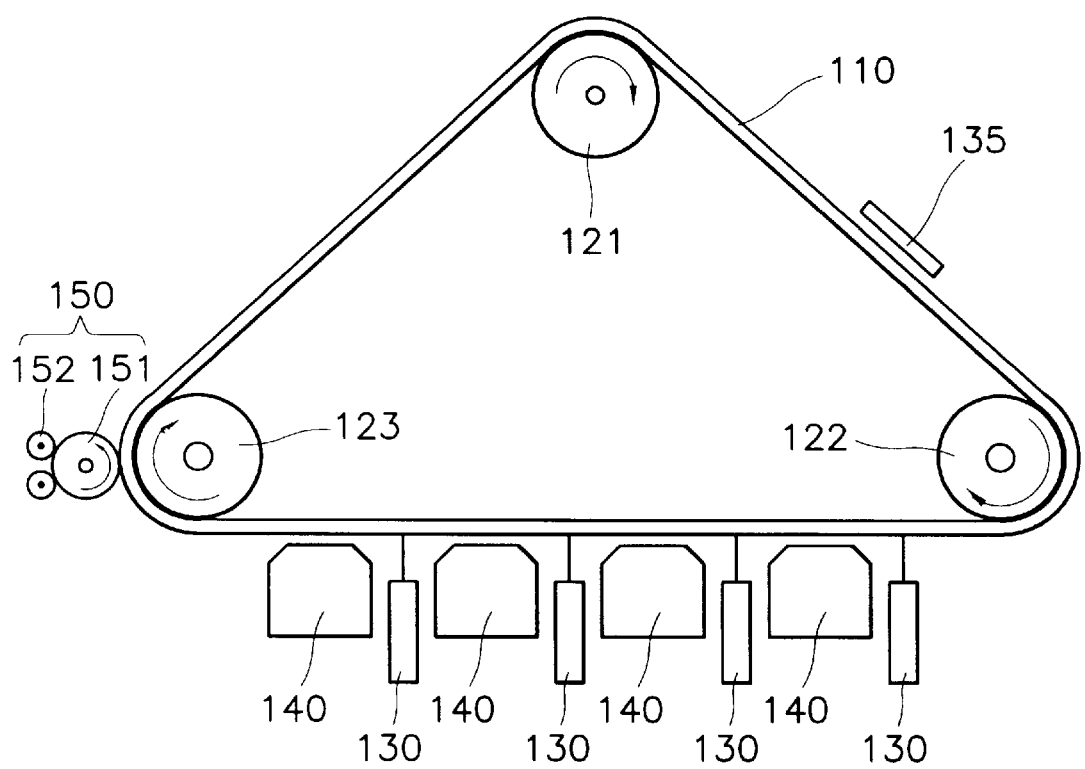
FIG. 1 is a schematic diagram illustrating important parts of a conventional liquid imaging system.
Figure 2:
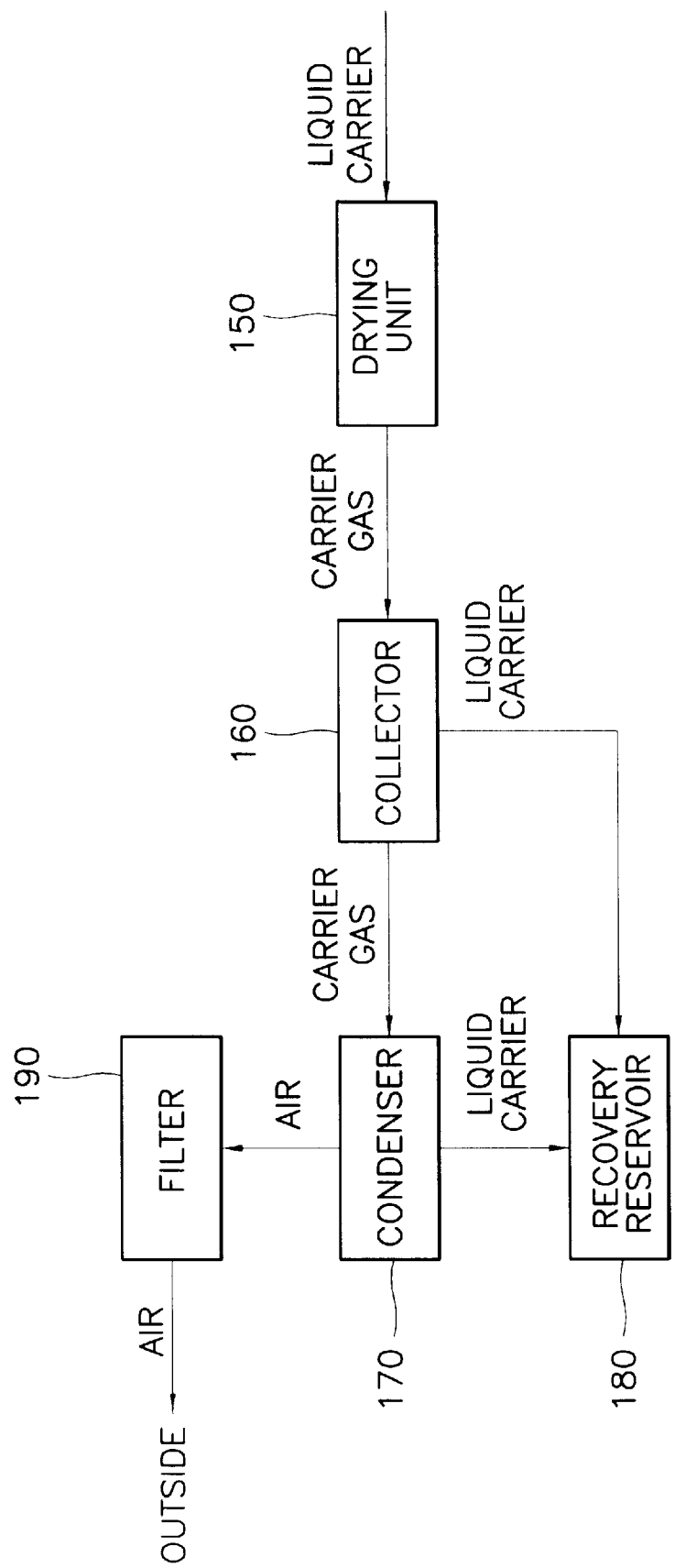
FIG. 2 is a block diagram of a carrier gas recovery mechanism of a carrier recovery apparatus of the conventional liquid imaging system.
Figure 3:
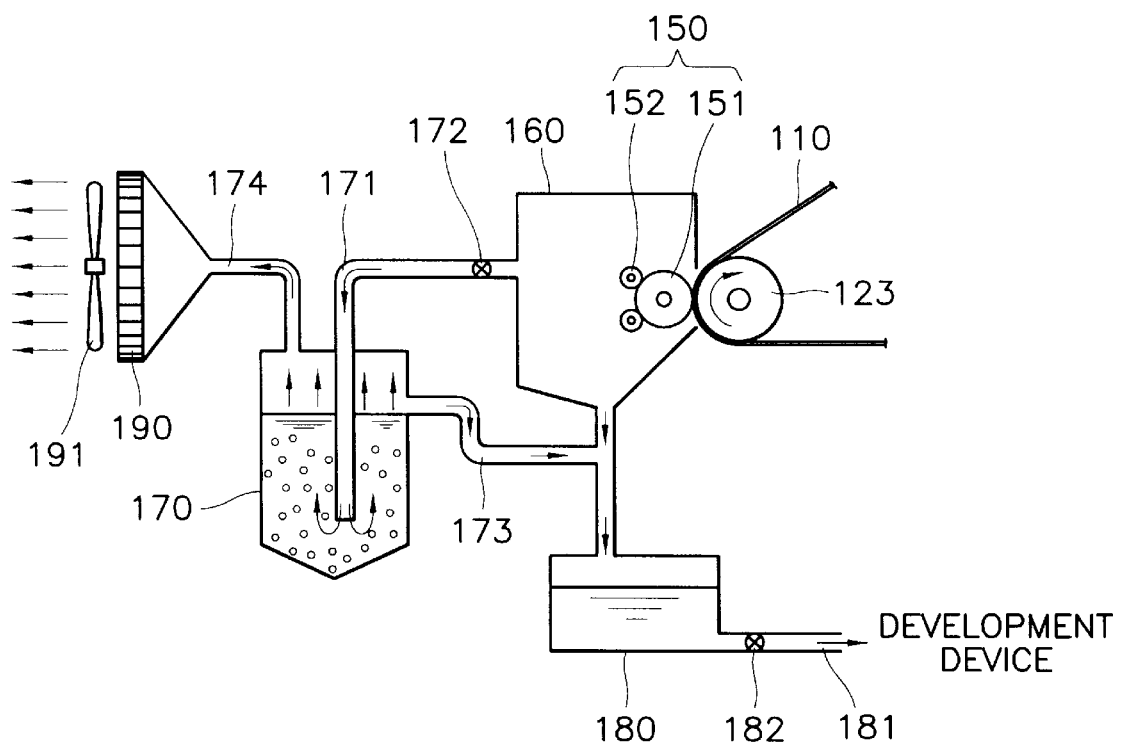
FIG. 3 is a schematic diagram of a carrier recovery apparatus of the conventional liquid imaging system.
Figure 4:
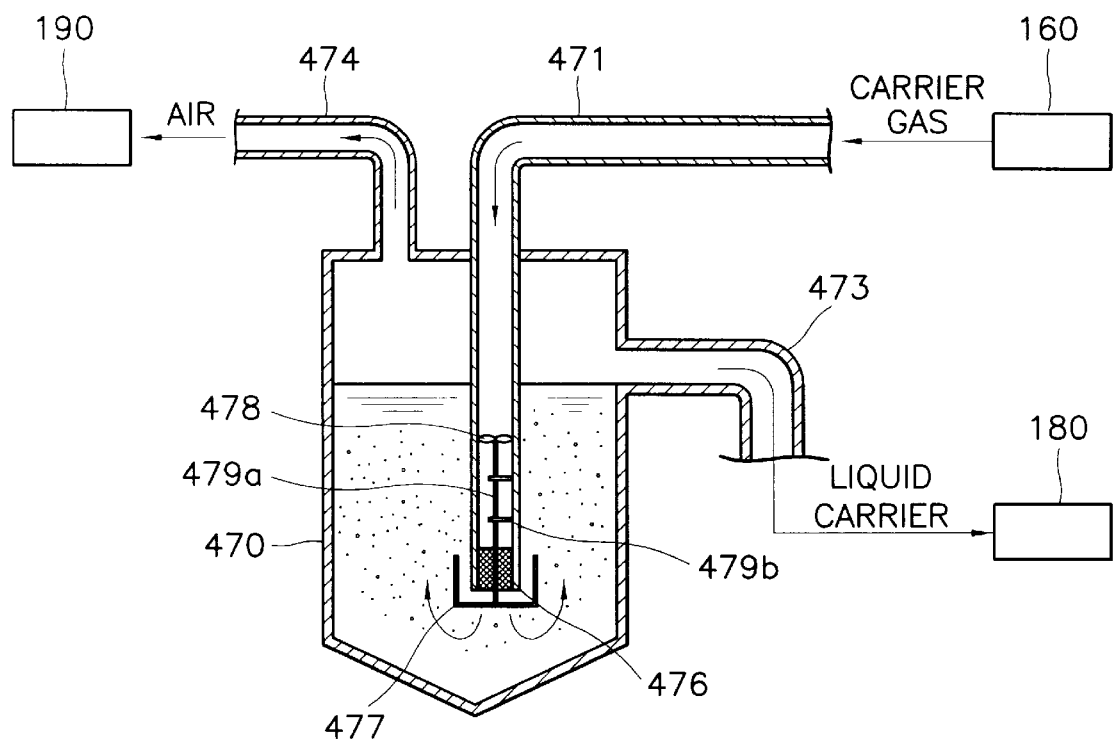
FIG. 4 is a schematic diagram of a condenser for a carrier recovery apparatus of a liquid imaging system according to the present invention.

Referring to FIG. 4, in a condenser 470 for a carrier gas recovery apparatus of an imaging system according to the present invention, a cold liquid carrier is contained. In the upper portion of the condenser 470, there are provided a gas duct 471 for inducing the carrier gas collected in a collector 160 for collecting the carrier gas and an air exhaust tube 474 for exhausting the air from which the carrier gas is removed. A liquid carrier exhaust tube 473 for exhausting the liquid carrier is connected to one side of the condenser 470. The liquid carrier exhaust tube 473 is installed a predetermined height from the bottom of the condenser 470 for maintaining a constant distance from the surface level of the cold liquid carrier contained in the condenser 470.

When the carrier gas collected in the collector 160 is induced into the condenser 470 via the gas duct 471, the air is also brought inside the condenser 470. Here, the carrier gas is contacted with the cold liquid carrier to then be liquefied, and the air is exhausted to the outside via the air exhaust tube 474 while passing through the liquid carrier. The air exhausted to the outside passes through a filter 190, and the condensed liquid carrier is exhausted to a recovery reservoir 180 via the liquid carrier exhaust tube 473 positioned at a predetermined height at one side of the condenser 470.

The characteristics of the condenser according to the present invention now will be described.

A bubble generator is provided at a vapor discharging end of the gas duct 471 for inducing the collected carrier gas into the liquid carrier contained in the condenser 470. The bubble generator generates fine bubbles from the carrier gas injected into the liquid carrier via the gas duct 471 to extend the contact area with the liquid carrier and decrease the upward movement speed, thereby effectively recovering the carrier gas.

The bubble generator includes a bubble generating member 476, a rotation member 477 and a rotation driving means (478, 479a and 479b). The bubble generating member 476 is made of a porous material and is pushed into the vapor discharging end of the gas duct 471 to make carrier gas bubbles. Thus, the carrier gas passing through the bubble generating member 476 is turned into small bubbles.

The rotation member 477 having a meshed shape is installed in front of the bubble generating member 476 and rotates to make the bubbles generated by the bubble generating member 476 into fine bubbles. In other words, the bubbles generated by the bubble generating member 476 are divided into finer bubbles by the mesh of the rotation member 477.

Thus, since the bubbles of the carrier gas injected into the liquid carrier contained in the condenser 470 are smaller, the contact area of the carrier gas bubbles with the liquid carrier increases. Also, since the upward movement sped of the bubbles is decreased to extend the contact time, more sufficient condensation is performed.

Figure 5:
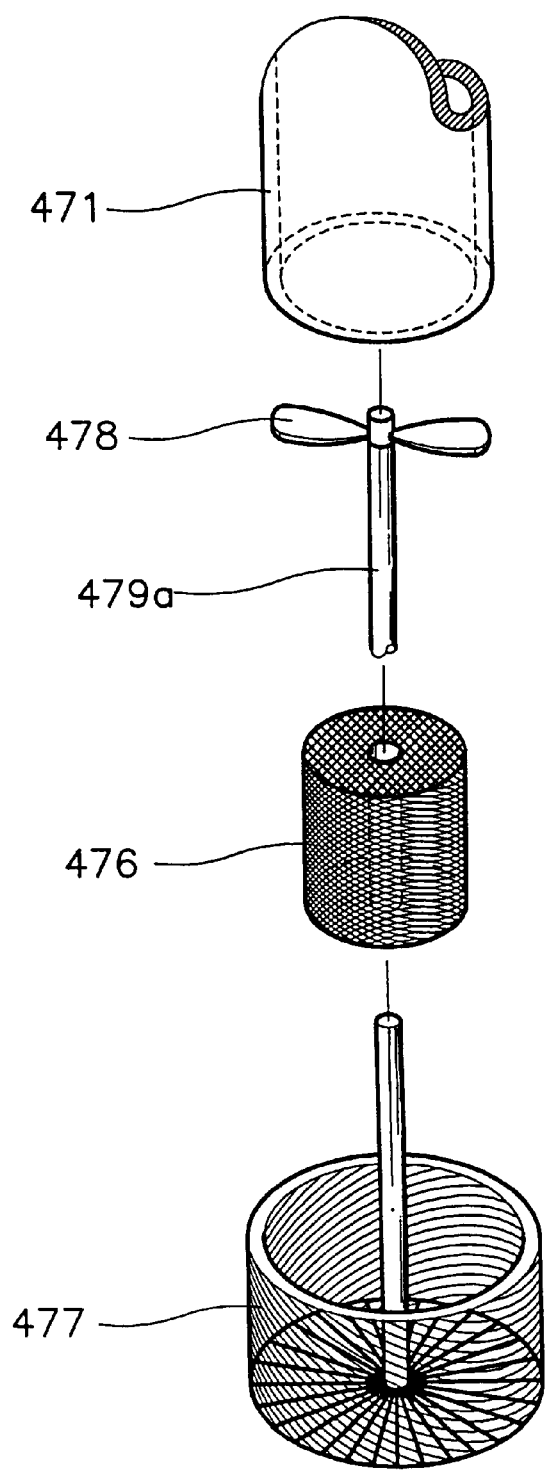
FIG. 5 is an exploded perspective view of a vapor generator of the condenser shown in FIG. 4.

To rotate the rotation member 477, the rotation driving means is necessary. Referring to FIG. 5, the rotation driving means includes a shaft 479a, a shaft supporting member 479b and a rotation blade 478. The shaft 479a is installed within the gas duct 471, and one end is connected to the rotational center of the rotation member 477 via the hollow of the bubble generating member 476. The shaft supporting member 479b for rotatably supporting the shaft 479a is provided within the gas duct 471. The rotation blade 478 is installed at the other end of the shaft 479a. The rotation blade 478 rotates by the flow of the carrier gas present within the gas duct 471. Accordingly, the rotation member 477 connected by the shaft 479a is rotated. Thus, the rotation driving means can rotate the rotation member 477 without using a separate driving motor.

As described above, according to the present invention, since the carrier gas injected into a condenser is turned into finer bubbles by a bubble generator, the contact area of the bubbles of the carrier gas with the liquid carrier increases. Also, since the upward movement speed of the bubbles is decreased to extend the contact time, condensation is sufficiently performed. Therefore, the recovery efficiency of the carrier gas is improved, and the amount of the uncondensed carrier vapor exhausted outside can be minimized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A condenser for a carrier gas recovery apparatus of a liquid imaging system for recovering a carrier gas in a liquid carrier by collecting and condensing the carrier gas evaporated by a drying unit of the imaging system, the condenser comprising:

a bubble generating member provided within a vapor discharging end of a gas duct for inducing the collected carrier gas into the liquid carrier contained in the condenser, for generating bubbles from the carrier gas;

a rotation member installed at the vapor discharging end of the gas duct, in front of the bubble generating member, which rotates to make the bubbles generated by the bubble generating member into finer bubbles; and a rotating driving means for rotating the rotating member, said rotating driving means being disposed within the gas duct, wherein said rotating driving means is rotated by the flow of the carrier gas present within the air duct.

2. The condenser according to claim 1, wherein the bubble generating member is made of a porous material.

3. The condenser according to claim 1, wherein the rotation member has a meshed structure.

4. A condenser for a carrier gas recovery apparatus of a liquid imaging system for recovering a carrier gas in a liquid carrier by collecting and condensing the carrier gas evaporated by a drying unit of the imaging system, the condenser comprising:

a bubble generating member provided at a vapor discharging end of a gas duct for inducing the collected carrier gas into the liquid carrier contained in the condenser, for generating bubbles from the carrier gas;

a rotation member installed at the vapor discharging end of the gas duct, in front of the bubble generating member, which rotates to make the bubbles generated by the bubble generating member into finer bubbles; and a rotating driving means for rotating the rotating member, wherein the rotation driving means comprises:

a shaft installed within the gas duct and having one end connected to the rotational center of the rotation member;

a shaft supporting member installed within the gas duct for rotatably supporting the shaft; and a rotation blade installed at the other end of the shaft, which rotates due to the flow of the carrier gas present within the gas duct, for rotating the rotation member.

5. A condenser for a carrier gas recovery apparatus of a liquid imaging system for recovering a carrier gas in a liquid carrier by collecting and condensing the carrier gas evaporated by a driving unit of the imaging system, the condenser comprising:

a bubble generating member provided at a vapor discharging end of a gas duct for inducing the collected carrier gas into the liquid carrier contained in the condenser, for generating bubbles from the carrier gas;

a rotation member having a meshed structure installed at the vapor discharging end of the gas duct, in front of the bubble generating member, which rotates to make the bubbles generated by the bubble generating member into finer bubbles; and a rotating driving means for rotating the rotating member, wherein the rotation driving means comprises:

a shaft installed within the gas duct, having one end connected to the rotational center of the rotation member;

a shaft supporting member installed within the gas duct for rotatably supporting the shaft; and a rotation blade installed at the other end of the shaft, which rotates due to the flow of the carrier gas present within the gas duct, for rotating the rotation member.

* * * * *